(12) United States Patent
Maier et al.

(10) Patent No.: US 12,098,344 B2
(45) Date of Patent: Sep. 24, 2024

(54) HIGH VISCOSITY BASE FLUIDS BASED ON OIL COMPATIBLE POLYESTERS PREPARED FROM LONG-CHAIN EPOXIDES

(71) Applicant: Evonik Operations GmbH, Essen (DE)

(72) Inventors: Stefan Karl Maier, Ober-Ramstadt (DE); Peter Altenbuchner, Muenster (DE); Fabian Ziegler, Darmstadt (DE); Christiane Zatocil, Herten (DE); Stefan Hilf, Zwingenberg (DE); Emily Clare Schweiβinger, Dortmund (DE); Jens Elsner, Hochheim (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/003,958

(22) PCT Filed: Jul. 1, 2021

(86) PCT No.: PCT/EP2021/068136
§ 371 (c)(1),
(2) Date: Dec. 30, 2022

(87) PCT Pub. No.: WO2022/003088
PCT Pub. Date: Jan. 6, 2022

(65) Prior Publication Data
US 2023/0257674 A1 Aug. 17, 2023

(30) Foreign Application Priority Data
Jul. 3, 2020 (EP) .................... 20183878

(51) Int. Cl.
| | | |
|---|---|---|
| C10M 145/22 | (2006.01) | |
| C08G 63/42 | (2006.01) | |
| C10M 169/04 | (2006.01) | |
| C10N 20/00 | (2006.01) | |
| C10N 20/02 | (2006.01) | |
| C10N 20/04 | (2006.01) | |
| C10N 30/02 | (2006.01) | |
| C10N 40/04 | (2006.01) | |
| C10N 70/00 | (2006.01) | |

(52) U.S. Cl.
CPC .......... *C10M 145/22* (2013.01); *C08G 63/42* (2013.01); *C10M 169/041* (2013.01); *C10M 2203/003* (2013.01); *C10M 2203/1006* (2013.01); *C10M 2203/1025* (2013.01); *C10M 2209/102* (2013.01); *C10M 2209/1023* (2013.01); *C10N 2020/011* (2020.05); *C10N 2020/02* (2013.01); *C10N 2020/04* (2013.01); *C10N 2030/02* (2013.01); *C10N 2040/04* (2013.01); *C10N 2070/00* (2013.01)

(58) Field of Classification Search
CPC . C08G 63/42; C10M 145/22; C10M 169/041; C10M 2203/003; C10M 2203/1006; C10M 2203/1025; C10M 2209/102; C10M 2209/1023; C10N 2020/011; C10N 2020/02; C10N 2020/04; C10N 2030/02; C10N 2040/04; C10N 2070/00
See application file for complete search history.

(56) References Cited

U.S. PATENT DOCUMENTS

| | | | |
|---|---|---|---|
| 3,968,148 A | 7/1976 | Leister et al. | |
| 4,615,827 A * | 10/1986 | Small, Jr. ............. | C10M 139/00 508/199 |
| 5,435,928 A | 7/1995 | Beck | |
| 5,691,284 A | 11/1997 | Beyer et al. | |
| 2012/0204940 A1 * | 8/2012 | Asanuma .......... | B32B 17/10761 428/441 |
| 2013/0165360 A1 | 6/2013 | Patil et al. | |
| 2013/0229016 A1 | 9/2013 | Ghahary et al. | |
| 2019/0127885 A1 * | 5/2019 | Amari ...................... | D01F 8/06 |

FOREIGN PATENT DOCUMENTS

| | | |
|---|---|---|
| CN | 109295526 | 2/2019 |
| CN | 110041514 | 7/2019 |
| DE | 3223694 | 3/1983 |
| DE | 3244004 | 5/1984 |
| DE | 10 2010 028 195 | 10/2011 |
| EP | 0 471 266 | 2/1992 |
| EP | 3 315 591 | 5/2018 |
| JP | H04-314770 | 11/1992 |
| JP | H10-72562 | 3/1998 |
| JP | 2010-69372 | 4/2010 |
| WO | 01/46350 | 6/2001 |
| WO | 2010/075023 | 7/2010 |
| WO | 2012/123267 | 9/2012 |

OTHER PUBLICATIONS

International Search Report dated Oct. 13, 2021, in PCT/EP2021/068136, 6 pages.
Written Opinion dated Oct. 13, 2021, in PCT/EP2021/068136, 8 pages.

* cited by examiner

*Primary Examiner* — James C Goloboy
(74) *Attorney, Agent, or Firm* — Grüneberg and Myers PLLC

(57) ABSTRACT

A polyester is useful as a high viscosity base fluid. A method for its preparation involves epoxidizing an alpha-olefin, reacting the alpha-epoxide or diol with a saturated linear aliphatic dicarboxylic acid, and isolating the polyester. Lubricant compositions can contain such polyesters and the compositions are useful as automatic transmission fluids, manual transmission fluids, continuously variable transmission fluids, gear oil formulations, industrial gear oil formulations, axle fluid formulations, dual clutch transmission fluids, dedicated hybrid transmission fluids, or as hydraulic oils.

17 Claims, No Drawings

HIGH VISCOSITY BASE FLUIDS BASED ON OIL COMPATIBLE POLYESTERS PREPARED FROM LONG-CHAIN EPOXIDES

CROSS-REFERENCE TO RELATED APPLICATIONS

This application is the National Stage entry under § 371 of International Application No. PCT/EP2021/068136, filed on Jul. 1, 2021, and which claims the benefit of priority to European Application No. 20183878.6, filed on Jul. 3, 2020. The content of each of these applications is hereby incorporated by reference in its entirety.

BACKGROUND OF THE INVENTION

Field of the Invention

The present invention is directed to polyesters, a method for their preparation and their use as high viscosity base fluids. It is further directed to lubricant compositions comprising such polyesters and to the use of such compositions as automatic transmission fluids, manual transmission fluids, continuously variable transmission fluids, differential gear oil formulations, industrial gear oil formulations, axle fluid formulations, dual clutch transmission fluids, dedicated hybrid transmission fluids or as hydraulic oils.

Description of Related Art

High viscosity base fluids are commonly used to lift the viscosity index (VI) and to thicken lubricant formulations with demanding shear stability requirements. A typical application are gear oils which have very demanding requirements due to high mechanical stress and a broad temperature range in operation.

High viscosity base fluids are known to have a kinematic viscosity at 100° C. ($KV_{100}$) of 30 to 1000 cSt.

Industrial gearboxes are expected to perform under conditions of high heat and heavy loads; and in environments are often contaminated with dirt, process debris and water. Without adequate protection, gears will wear prematurely. That means that certain parts have to be replaced more frequently, the oil has to be changed more frequently, and worst of all, equipment downtime has to be expected.

Today's gear driven equipment is designed to perform in many applications, often having to withstand harsh environments. Typically, gear boxes are becoming smaller and are being made from lighter and more sophisticated materials, yet they must be more durable than ever before. As a result, greater demands are being placed upon the gear oil lubricant and greater consideration must be given to the use of high-performance base fluids and additives.

Typical products in this market are high viscosity polyalphaolefins (PAOs) and metallocene catalyzed PAOs (mPAOs), typically sold in viscosity ranges of 40 to 300 cSt at 100° C. (Choudary et al., Lubricant Sciences 2012, 23-44). Formulations based on high viscosity PAOs are known to have the best performance at low temperatures, but their weakness is the low polarity. Due to the apolar nature of PAO base oils, dispersion inhibitor (DI) packages and ageing products are poorly dissolved in the oil causing various problems.

Higher polarity is provided by copolymers of alpha-olefins with maleates (U.S. Pat. No. 5,435,928), oligomers of alpha-olefins with alkyl acrylates (U.S. Pat. No. 3,968, 148) or copolymers of alpha-olefins with alkyl methacrylates (U.S. Pat. No. 5,691,284). Alternatively, PAOs with ester-functionalized monomers (EP2970532) or polyvinylethers (US 2013/0165360) can be applied. A big advantage of using polar high viscosity base fluids is that no polar low viscous fluids, such as esters, must be used as compatibilizers for the DI package. Polar low viscous fluids are known to cause problems with coatings and seals which is less of an issue for high viscosity fluids.

Ester fluids are commonly used as compatibilizers. There is reported a variety of suitable diesters and polyolesters (L. R. Rudnick, Synthetics, Mineral Oils, and Bio-Based Lubricants: Chemistry and Technology, $2^{nd}$ Edition, 2013, page 51ff). Unfortunately, the options are limited to esters with low molecular weight as complex esters are not compatible with the apolar base oils used in the application. An exception are polyesters made from dimer acids, but these provide low performance in lubricants due the cyclic structures which are a result of the dimer acid production process (WO 01/46350).

Polyesters can be made from diacids and diols. The idea behind using dimer acids is to introduce the oil compatibility via a more apolar diacid. An alternative could be the use of diols made by epoxidation of alpha olefins. Such epoxides can be used to make oil-compatible polyalkyleneglycols (L. R. Rudnick, Synthetics, Mineral Oils, and Bio-Based Lubricants: Chemistry and Technology, $2^{nd}$ Edition, 2013, page 123ff; EP 3315591).

SUMMARY OF THE INVENTION

It was now surprisingly found that epoxides prepared from alpha-olefins can be used to prepare polyesters that show good oil compatibility. Main factor for the oil-compatibility of the polymers is their polarity which should be as low as possible. While the epoxides according to this invention are less polar than common diols used for polyesters the required low oxygen content in the polyesters is only achieved in combination with sufficiently apolar diacids. The contribution to lower polarity by both, diacids and diols, is limited as too long linear carbon chains will ultimately lead to a waxy polymer which is not liquid anymore.

DETAILED DESCRIPTION OF THE INVENTION

A first object of the present invention is directed to polyesters prepared from alpha-epoxides derived from alpha-olefins or from diols that are derived from alpha-epoxides comprising 10 to 16 carbon atoms and dicarboxylic acids comprising 5 to 13 carbon atoms.

The molar ratio of carbon to oxygen in the polyesters is preferably in the range of 5:1 to 12:1, more preferably in the range of 5.5:1 to 8:1, and even more preferably in the range of 6:1 to 7:1.

The number-average molecular weight $M_n$ of the polyesters according to the present invention is preferably in the range from 1,000 to 15,000 g/mol, preferably 2,000 to 11,000 g/mol.

Preferably, the polyesters according to the present invention have a polydispersity index (PDI) $M_w/M_n$ in the range of 1.5 to 6, preferably in the range of 1.8 to 5, more preferably in the range of 2 to 4.

$M_w$ and $M_n$ are determined by size exclusion chromatography (SEC) using commercially available polymethylmethacrylate standards. The determination is affected by gel permeation chromatography with THF as eluent.

The term "alpha-olefins" means olefins containing an unsaturated double bond in the alpha-position. They are commercially available.

The term "alpha-epoxides" means epoxides prepared from alpha-olefins.

The olefin feedstock used in accordance with the present invention is selected from alpha-olefins comprising 10 to 16 carbon atoms, preferably 12 to 14 carbon atoms. The invention is not limited to feedstocks comprising a single component; mixtures of more than one component also with different chain length may be used as well.

In a further embodiment, the olefin feedstock used as starting material is a mixture of alpha-olefins comprising at least 90% by weight of mono-olefinic linear alpha-olefins.

The dicarboxylic acids usable in the present inventions are saturated linear aliphatic dicarboxylic acids selected from the group consisting of glutaric acid (pentanedioic acid), 2,2-dimethylglutaric acid (2,2-dimethylpentanedioic acid), adipic acid (hexanedioic acid), 2,4,4-trimethyladipic acid (2,4,4-trimethylhexanedioic acid), pimelic acid (heptanedioic acid), suberic acid (octanedioic acid), azelaic acid (nonanedioic acid), sebacic acid (decanedioic acid), undecanedioic acid, dodecanedioic acid, brassylic acid (tridecanedioic acid) and mixtures thereof; preferred are azelaic acid (nonanedioic acid), sebacic acid (decanedioic acid), dodecanedioic acid and mixtures thereof. The main industrial process employed for manufacturing dicarboxylic acids is the ring-opening oxidation of cyclic compounds. They are generally manufactured on an industrial scale and are therefore commercially available.

In the polyesters according to the present invention, preferably 30% or less, more preferably 20% or less, more preferably 10% or less of the terminal functionalities are COOH-functionalities.

The bulk viscosity of the polyesters, measured as kinematic viscosity at 100° C., is in the range of 40 to 2000 cSt, preferably in the range of 100 to 1500 cSt, more preferably 300 to 1100 cSt.

A second object of the present invention is directed to the use of the polyesters as described herein before as base oils in lubricant formulations, especially in gear oil formulations.

A further object of the present invention is directed to a method of lubricating a gear, comprising the steps of:
(i) preparing a formulation by using at least one polyester as described further above as a base oil;
(ii) optionally combining the polyester with another base oil selected from the group consisting of API Group II oils, API Group III oils, API Group IV oils, and mixtures thereof; and
(iii) applying the formulation prepared under (ii) to an industrial gear.

A third object of the present invention is directed to lubricating composition, comprising:
(A) 20 to 60% by weight of at least one polyester prepared from alpha-epoxides that are derived from alpha-olefins comprising 10 to 16 carbon atoms, or from diols that are derived from that alpha-epoxides, and diacids comprising 5 to 13 carbon atoms;
(B) 40 to 80% by weight of a base oil selected from the group consisting of API Group II oils, API Group III oils, API Group IV oils, and mixtures thereof; and
(C) 0 to 5% by weight of one or more additives.

The content of each component (A), (B) and (C) is based on the total weight of the base oil composition. In a particular embodiment, the proportions of components (A), (B) and (C) add up to 100% by weight.

The polyesters to be used are as described further above.

The base oil to be used in the lubricating composition comprises an oil of lubricating viscosity. Such oils include natural and synthetic oils, oils derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare a lubricating composition in accordance with the present invention is preferably in the range of 5 mm$^2$/s to 15 mm$^2$/s, more preferably in the range of 6 mm$^2$/s to 113 mm$^2$/s, and even more preferably in the range of 8 mm$^2$/s to 12 mm$^2$/s, determined to ASTM D445.

Particularly preferred lubricants of the present invention comprise at least one base oil selected from the group consisting of API Group II oils, API Group III oils, polyalphaolefins (PAO) and mixtures thereof.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for gear oil formulations are used base oils of API Group II, III, IV or mixtures thereof.

The lubricating composition according to the invention may also contain, as component (C), further additives selected from the group consisting of pour point depressants, dispersants, defoamers, detergents, demulsifiers, antioxidants, antiwear additives, extreme pressure additives, friction modifiers, anticorrosion additives, dyes and mixtures thereof.

Preferred pour point depressants are, for example, selected from the group consisting of alkylated naphthalene and phenolic polymers, polyalkyl methacrylates, maleate copolymer esters and fumarate copolymer esters, which may conveniently be used as effective pour point depressants.

The lubricating oil composition may contain 0.1% by weight to 0.5% by weight of a pour point depressant. Preferably, not more than 0.3% by weight of a pour point depressant is used.

Appropriate dispersants include poly(isobutylene) derivatives, for example poly(isobutylene)succinimides (PIBSIs), including borated PIBSIs; and ethylene-propylene oligomers having N/O functionalities.

Suitable defoaming agents include, for example, silicone oils, fluorosilicone oils, and fluoroalkyl ethers.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Preferred demulsifiers include alkyleneoxide copolymers and (meth)acrylates including polar functions.

The suitable antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

The preferred antiwear and extreme pressure additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds having sulfur and phosphorus, for example metal dithiophosphates, e.g. zinc di-$C_{3-12}$-alkyldithiophosphates (ZnDTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbornadiene, α-pinene, polybutene, acrylic esters, maleic esters, triphenyl phosphorothionate (TPPT); compounds having sulfur and nitrogen, for example zinc bis(amyldithiocarbamate) or methylenebis(di-n-butyl dithiocarbamate); sulfur compounds with elemental sulfur and $H_2S$ sulfurized hydrocarbons (diisobutylene, terpene); sulfurized glycerides and fatty acid esters; overbased sulfonates; chlorine compounds or solids, such as graphite or molybdenum disulfide.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Dispersants (including borated dispersants) are preferably used in a concentration of 0% to 2% by weight, defoamers in a concentration of 10 to 2500 ppm, detergents in a concentration of 0.05% to 1% by weight, demulsifiers in a concentration of 0% to 0.1% by weight, antioxidants in a concentration of 0.5% to 1.5% by weight, antiwear and extreme pressure additives each in a concentration of 0.1% to 1% by weight, friction modifiers in a concentration of 0.05% to 2% by weight, anticorrosion additives in a concentration of 0.05% to 0.5% by weight, and dyes in a concentration of 0.01% to 1% by weight. The concentration is based in each case on the total weight of the lubricating oil composition.

Preferably, the total concentration of the one or more additives (C) in a lubricating oil composition is up to 5% by weight, more preferably 0.1% to 4% by weight, more preferably 0.5% to 3% by weight, based on the total weight of the lubricating oil composition.

A further object of the present invention is directed to a method for preparing the polyesters according to the present invention, the process comprising the steps of:

(a) epoxidizing an alpha-olefin comprising 10 to 16 carbon atoms;

(b1) reacting the alpha-epoxide retrieved under step (a) with a dicarboxylic acid comprising 5 to 13 carbon atoms, or (b2) transferring the alpha-epoxide retrieved under step (a) to the corresponding diol and reacting the diol with a dicarboxylic acid comprising 5 to 13 carbon atoms; and (c) isolating the desired polyester.

The invention has been further illustrated by the following non-limiting examples.

EXPERIMENTAL PART

Abbreviations

ADI adipic acid
AN acid number
AZE azelaic acid
BV40 bulk viscosity @40° C.
CP cloud point
DDS dodecanedioic acid KV kinematic viscosity measured according to ASTM D445

$KV_{40}$ kinematic viscosity measured @40° C. to ASTM D445

$KV_{100}$ kinematic viscosity measured @100° C. to ASTM D445

$M_n$ number-average molecular weight $M_w$ weight-average molecular weight

NB3020 Nexbase® 3020; Group III base oil from Neste with a $KV_{100}$ of 2.2 cSt NB3043 Nexbase® 3043; Group III base oil from Neste with a $KV_{100}$ of 4.3 cSt NS3 naphthenic base oil from Nynas with a $KV_{40}$ of 3 cSt OHN hydroxyl number PDI polydispersity index PP pour point SEB sebacic acid VI viscosity index Test Methods The polyesters according to the present invention and the comparative examples were characterized with respect to their molecular weight, PDI, bulk viscosity at 100° C. ($BV_{100}$), pour point (PP), melting point $T_m$, glass transition temperature $T_g$, OH number and acid number. Molecular weights were determined by size exclusion chromatography (SEC) using commercially available polymethylmethacrylate (PMMA) standards. The determination is effected by gel permeation chromatography (GPC) to DIN 55672-1 with THF as eluent (flow rate: 1 mL/min; injected volume: 100 µl).

The bulk viscosity $BV_{100}$ was determined to ASTM D445.

The pour point was determined to ASTM D97.

Determining the thermal properties ($T_g$ and $T_m$) of the polyesters employed in the present invention was carried out by differential scanning calorimetry (DSC) according to DSC method DIN 11357-1. The OH-number of the polyesters was determined titrimetrically in mg KOH/g polymer according to DIN 53240-2.

The acid number of the polyesters was determined by titration according to DIN EN ISO 2114. Values are reported as mg (KOH)/g (sample).

The lubricating compositions including the polyesters according to the present invention and comparative examples were characterized with respect to kinematic viscosity at 40° C. ($KV_{40}$) and 100° C. ($KV_{100}$) to ASTM D445, their viscosity index (VI) to ASTM D2270 and their pour point to ASTM D97.

Synthesis of Polyesters

A round-bottom flask equipped with a reflux condenser, mechanical stirrer, nitrogen inlet and thermometer was charged with epoxide, acid and catalyst under nitrogen bubbling. Subsequently, the reaction mixture was heated over time 1 to 225° C. After an additional time 2, the desired acid number was reached, and the reaction stopped.

The amounts of epoxide, acid and catalyst used to prepare working examples and comparative examples are shown in the following Table 1. As catalyst was always used tin(II) 2-ethylhexanoate (commercially available from TIB Chemicals AG).

TABLE 1

Compositions of reaction mixtures used to prepare the working examples and comparative examples.

| Example # | Epoxide | Amount | Diacid | Amount | Catalyst |
|---|---|---|---|---|---|
| 1*) | alpha C10 | 81.3 g<br>0.52 mol | ADI | 75.9 g<br>0.52 mol | 1.0 g |
| 2 | alpha C12 | 64.5 g<br>0.35 mol | SEB | 70.7 g<br>0.35 mol | 1.4 g |
| 3 | alpha C10 | 62.5 g<br>0.40 mol | SEB | 80.8 g<br>0.40 mol | 1.4 g |
| 4 | alpha C12 | 68.2 g<br>0.37 mol | SEB | 74.7 g<br>0.37 mol | 1.4 g |
| 5 | alpha C16 | 74.5 g<br>0.31 mol | SEB | 62.6 g<br>0.31 mol | 1.4 g |
| 6 | alpha C14 | 76.7 g<br>0.36 mol | SEB | 72.7 g<br>0.36 mol | 1.5 g |
| 7 | alpha C14 | 76.7 g<br>0.36 mol | SEB<br>AZE | 36.4 g<br>0.18 mol<br>33.8 g<br>0.18 mol | 1.4 g |

*)comparative example

The alpha-C10 to C16 olefins and epoxides were purchased from Tokyo Chemical Industry.

The reaction times and acid numbers of the resulting polyesters are shown in the following Table 2.

TABLE 2

Reaction times, hydroxyl numbers (OHN), acid numbers (AN) and C/O-ratios of the resulting polyesters.

| Example # | Time 1 [hours] | Time 2 [hours] | OHN [mg KOH/g] | AN [mg KOH/g] | Ratio C:O |
|---|---|---|---|---|---|
| 1*) | 2 | 31 | n.d. | 25.0 | 4 |
| 2 | 8 | 31 (+7) | n.d. | 5.1 (2.3**) | 5.5 |
| 3 | 13 | 37 | 4.8 | 1.3 | 5 |
| 4 | 9 | 24 | 10.3 | 0.5 | 5.5 |
| 5 | 13 | 33 | 15.5 | 1.2 | 6.5 |
| 6 | 12 | 34 | 12.8 | 0.2 | 6 |
| 7 | 12 | 20 | 5.2 | 2.0 | 5.9 |

*)comparative example
**)after addition of 0.82 g of ethylhexanol and additional 7 hours reaction time
n.d. not detectable Table 2 shows that the acid numbers of the working examples are in the range of 0.2 (Example 6) to 2.3 (Example 2) mg KOH/g after reaction times of overall 32 hours (Example 7) to 50 hours (Example 3).

Without special end-capping as done for Example 2, the terminal groups of a polyester can be either an OH— or a COOH-function. For oil compatibility and lubricant durability, not more than 30% of the terminal functionalities should be COOH-functions.

The C/O-ratios were calculated by summing up the number of carbon atoms present in the diol and in the diacid monomers and dividing the resulting numbers by four (4=number of oxygen atoms in the resulting diester unit). Effects of terminal groups are neglected in this simplified calculation method. For monomer mixtures, the average amount of carbons was used. The resulting ratios for the working examples are between 5 (Example 3) and 6.5 (Example 5).

The C/O-ratios are a simple measure for the polarity of the polymer.

The characteristics of the polyesters prepared according to the present invention are shown in the following Table 3.

TABLE 3

Characteristics of the polyesters prepared according to the present invention.

| Example # | $M_n$ [g/mol] | $M_w$ [g/mol] | PDI | BV100 [mm²/s] | PP [° C.] | $T_m$ [° C.] | $T_g$ [° C.] |
|---|---|---|---|---|---|---|---|
| 1*) | 5,129 | 13,200 | 2.6 | 225 | −24 | — | −57.9 |
| 2 | 8,260 | 28,200 | 3.4 | 572 | −9 | −6.9 | — |
| 3 | 10,700 | 33,200 | 3.1 | 1078 | −27 | −27.4 | −55.4 |
| 4 | 9,030 | 26,800 | 3.0 | 580 | −12 | −5.2 | — |
| 5 | 6,000 | 14,600 | 2.4 | **) | 18 | 15.8 | — |
| 6 | 7,260 | 21,900 | 3.0 | 398 | 3 | 2.3 | — |
| 7 | 9,010 | 31,900 | 3.5 | 827 | −6 | −1.3 | — |

*)comparative example
**) not measured as viscosity was too high

The number-average molecular weights of the polyesters according to the present inventions are in the range of 6,000 g/mol (Example 5) to 10,700 g/mol (Example 3). The thermal properties determined by DSC cover a broad range.

To proof the performance of the polyesters in accordance with the present invention in base oils, lubricating compositions were prepared containing different amounts of the polyesters.

The results for the typical performance parameters like KV40, KV100 and VI are presented in the following Tables 4.

TABLE 4a

Characteristics of the polyesters in naphthenic API Group V base oil.

| | 5% polyester in NS3 | | | 20% polyester in NS3 | | |
|---|---|---|---|---|---|---|
| Ex # | KV40 [mm²/s] | KV100 [mm²/s] | VI | KV40 [mm²/s] | KV100 [mm²/s] | VI |
| 1*) | 3.75 | 1.47 | n.d. | 12.03 | 3.37 | 167 |
| 2 | 4.51 | 1.78 | n.d. | 17.97 | 5.79 | 309 |
| 3 | 4.79 | 1.91 | n.d. | 22.50 | 7.28 | 325 |
| 4 | 4.60 | 1.81 | n.d. | 18.79 | 6.05 | 313 |
| 5 | 4.09 | 1.59 | n.d. | 11.79 | 3.85 | 258 |
| 6 | 4.39 | 1.72 | n.d. | 16.53 | 5.35 | 303 |
| 7 | 4.78 | 1.88 | n.d. | 20.45 | 6.65 | 323 |

*)comparative example
n.d. = not defined

TABLE 4b

Characteristics of the polyesters in API Group I base oil.

| | 5% polyester in 150N Gr I oil | | |
|---|---|---|---|
| Example # | KV40 [mm²/s] | KV100 [mm²/s] | VI |
| 1*) | not soluble | not soluble | not soluble |
| 2 | 41.56 | 7.24 | 138 |
| 3 | not soluble | not soluble | not soluble |
| 4 | not soluble | not soluble | not soluble |
| 5 | 39.78 | 6.67 | 122 |
| 6 | 41.81 | 7.07 | 130 |
| 7 | 44.09 | 7.54 | 138 |

*)comparative example

TABLE 4c

Characteristics of the polyesters in API Group III base oil.

| | 5% polyester in NB3020 | | | |
|---|---|---|---|---|
| Example # | KV40 [mm²/s] | KV100 [mm²/s] | VI | PP [° C.] |
| 1*) | not soluble | not soluble | not soluble | not soluble |
| 2 | not soluble | not soluble | not soluble | not soluble |
| 3 | not soluble | not soluble | not soluble | not soluble |
| 4 | not soluble | not soluble | not soluble | not soluble |
| 5 | 9.87 | 2.83 | 140 | −36 |
| 6 | 10.29 | 2.99 | 156 | −12 |
| 7 | 10.88 | 3.2 | 175 | −39 |

*)comparative example

Conclusions

The given examples are all rather apolar polyesters (compared to commercially available polyesters) and are compatible with naphthenic base oils which are known for their good solvency compared to other base oils. For a broad application as thickeners for gear oils, compatibility with API Group I-III base oils is required.

Main parameter for this oil-compatibility is the polarity. The C/O-ratio is a very simple way to display the polarity of different polyesters. As can be seen from Tables 4, the examples with C/O-ratios below 5 do not show the required solubility. And even a C/O-ratio above 5 can give borderline results as for examples 3 and 4 which were classified as insoluble in the Group I base oil due to some turbidity in the formulation. Other parameters like melting point and glass transition temperature show poor correlation with the observed oil compatibility.

Example 5 demonstrates the limit regarding the contribution to non-polarity from the diol. It was prepared by using a C16 diol. Despite its good oil-compatibility, this polymer is not liquid and too waxy to meet the expectations for a high viscosity base fluid.

Adjustment of molecular weight balances thickening power and shear stability which are the most fundamental properties of a thickener and the required shear stability level is basically defined by the application. For gear oils, the shear stability levels are known to be very severe. That means that polymers with a weight-average molecular weight above 35,000 g/mol are not suitable for demanding applications.

The invention claimed is:

1. A polyester, obtained from reaction of:
   an alpha-epoxide derived from an alpha-olefin having 10 to 16 carbon atoms, or a diol derived from the alpha-epoxide,
   with
   at least one saturated linear aliphatic, dicarboxylic acid selected from the group consisting of azelaic acid (nonanedioic acid), sebacic acid (decanedioic acid), dodecanedioic acid, and a mixture thereof,
   wherein the polyester has a number-average molecular weight $M_n$ in the range of 1,000 to 15,000 g/mol, determined by size exclusion chromatography (SEC) using polymethylmethacrylate standards.

2. The polyester according to claim 1, wherein the alpha-olefin has 12 to 14 carbon atoms.

3. The polyester according to claim 1, wherein 30% or less of terminal functionalities of the polyester are COOH-functions.

4. The polyester according to claim 1, having a kinematic viscosity at 100° C. (KV1001) in the range of 40 to 2000 cSt.

5. The polyester according to claim 1, wherein a molar ratio of carbon to oxygen, calculated by summing up the number of carbon atoms present in the diol and in diacid monomers and dividing the resulting numbers by four as being the number of oxygen, atoms in a resulting diester unit, is in the range of 5:1 to 12:1.

6. A method of lubricating an industrial gear comprising:
preparing a lubricant formulation comprising the polyester according to claim 1 as a base oil,
optionally, adding a further base oil selected from the group consisting of API Group II oils, API Group III oils, API Group IV oils, and a mixture thereof, to the lubricant formulation, and
applying the lubricant formulation to the industrial gear.

7. A lubricating composition, comprising:
(A) 20 to 60% by weight of at least one polyester prepared from an alpha-epoxide derived from an alpha-olefin having 10 to 16 carbon atoms, or from a diol derived from the alpha-epoxide, and at least one saturated linear aliphatic diacid selected from the group consisting of azelaic acid (nonanedioic acid), sebacic acid (decanedioic acid), dodecanedioic acid, and a mixture thereof;
(B) 40 to 80% by weight of a base oil selected from the group consisting of API Group II oils, API Group III oils, API Group IV oils, and a mixture thereof; and
(C) 0 to 5% by weight of one or more additives, based on a total weight of the lubricating composition.

8. The lubricating, composition according to claim 7, wherein the alpha-olefin has 12 to 14 carbon atoms.

9. The lubricating composition according to claim 7, wherein the one or more additives (C) are selected from the group consisting of pour point depressants, dispersants, defoamers, detergents, demulsifiers, antioxidants, antiwear additives, extreme pressure additives, friction modifiers, anticorrosion additives, dyes, and a mixture thereof.

10. A method for preparing the polyester according to claim 1, the method comprising:

(a) epoxidizing the alpha-olefin having 10 to 16 carbon atoms;
(b1) reacting the alpha-epoxide retrieved under (a) with the at least one saturated linear aliphatic dicarboxylic acid selected from the group consisting of azelaic acid (nonanedioic acid), sebacic acid (decanedioic acid), dodecanedioic acid, and a mixture thereof; or
(b2) transferring the alpha-epoxide retrieved under (a) to the corresponding diol and reacting the diol with the at least one saturated linear aliphatic dicarboxylic acid selected, from the group consisting of azelaic acid (nonanedioic acid), sebacic acid (decanedioic acid), dodecanedioic acid, and a mixture thereof; and
isolating the polyester.

11. The polyester according to claim 3, wherein 10% or less of the terminal functionalities of the polyester are COOH-functions.

12. The polyester according to claim 4, wherein the KV100 is in the range of 100 to 1,500 cSt.

13. The lubricating composition according to claim 7, wherein the lubricating composition is a gear oil formulation.

14. The lubricating composition according to claim 7, wherein the at least one polyester has a number-average molecular weight $M_n$ in the range of 1,000 to 15,000 g/mol, determined by size exclusion chromatography (SEC) using polymethylmethacrylate standards.

15. The lubricating composition according to claim 14, wherein the alpha-olefin has 12 to 14 carbon atoms.

16. The lubricating composition according to claim 14, wherein the one or more additives (C) are selected from the group consisting of pour point depressants, dispersants, defoamers, detergents, demulsifiers, antioxidants, antiwear additives, extreme pressure additives, friction modifiers, anticorrosion additives, dyes, and a mixture thereof.

17. The lubricating composition according to claim 14, wherein the lubricating composition is a gear oil formulation.

* * * * *